Feb. 22, 1949.  D. LARKIN  2,462,408

REEL

Filed Oct. 11, 1945

INVENTOR:
David Larkin,
By Carr Karr & Gravely,
His ATTORNEYS.

Patented Feb. 22, 1949

2,462,408

UNITED STATES PATENT OFFICE 2,462,408

REEL

David Larkin, Kirkwood, Mo., assignor to Broderick & Bascom Rope Company, St. Louis, Mo., a corporation of Missouri Application October 11, 1945, Serial No. 621,807

1 Claim. (Cl. 242—124)

This invention relates to reels for storing and shipping wire rope, cordage or other strand material and more particularly to reels comprising a drum and separate heads secured to the ends thereof by a circular series of bolts that extend from end to end of said reel. The principal object of the present invention is to provide for quickly and easily positioning both heads on the drum with their bolt holes in alinement and to provide means for guiding the bolts from the bolt holes in one head to corresponding bolt holes in the other head. Other objects are simplicity and economy of construction and compactness of design. The invention consists in the reel and in the parts and combinations and arrangements of parts hereinafter described and claimed.

In the accompanying drawing, which forms part of this specification and wherein like symbols refer to like parts wherever they occur, Fig. 1 is a part end elevational view and part cross-sectional view of a reel embodying my invention, Fig. 2 is a side elevational view of said reel, Fig. 3 is an enlarged fragmentary cross-sectional view on the line 3—3 in Fig. 2.

Figure 1:
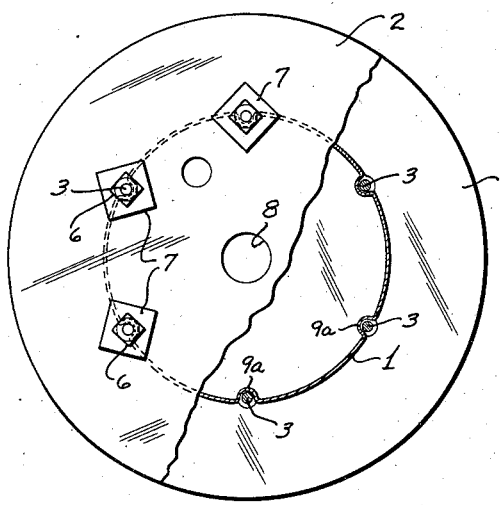
Figure 2:
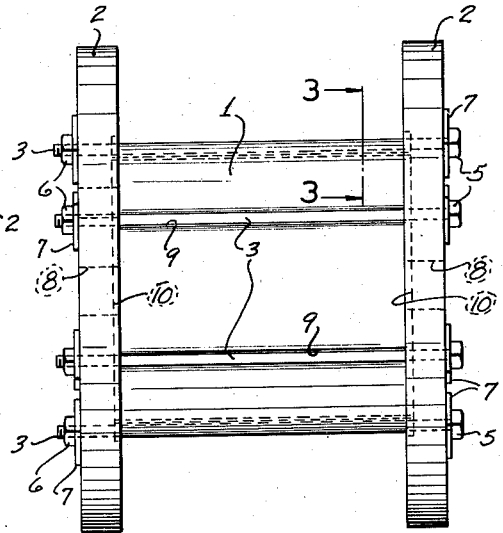
Figure 3:
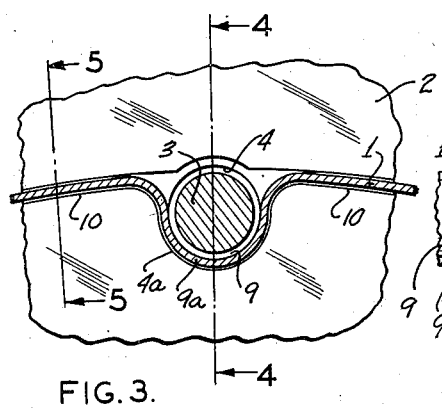
Figure 4:
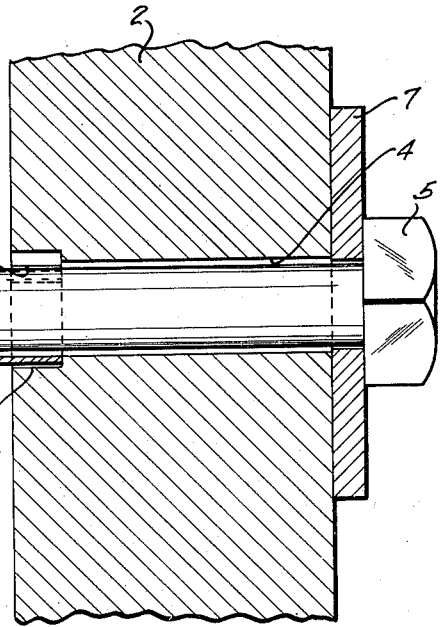
Fig. 4 is a longitudinal sectional view on the line 4—4 in Fig. 3.
Figure 5:
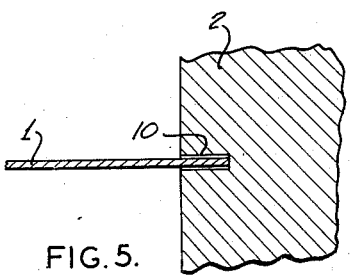
Fig. 5 is a similar view on the line 5—5 in Fig. 3.

My reel comprises a cylindrical metal shell or drum 1, a pair of separate wooden heads or disks 2 of larger diameter than said drum mounted on the flangeless ends thereof concentric therewith, and a circular series of bolts 3 that extend parallel with the axis of the drum from end to end thereof and through similar series of alined bolt holes 4 in said pair of heads or disks. The heads 5 and nuts 6 of the bolts bear against square washers 7 that seat against the outer end faces of the drum heads or disks 2. The drum heads 2 have central openings 8 therethrough, whereby the reel is adapted for mounting on a supporting spindle (not shown) for running the wire rope or other strand material (not shown) on and off said reel.

As shown in the drawing, the metal drum 1 is shaped to provide a series of circumferentially spaced grooves 9 in the outer peripheral surface thereof. The grooves 9 extend parallel with the axis of the drum 1 from end to end thereof and are adapted to register with the bolt holes 4 in the circular drum heads 2 so that the bolts 3 may be inserted through the bolt holes in one head and guided by said grooves into the bolt holes in the other head. The grooves 9 are deep enough to bring the bolts 3 therein substantially flush with the outer peripheral surface of the drum 1. The inner or opposing faces of the heads 2 have annular grooves 10 formed therein concentric therewith that are adapted to receive the end portions of the drum 1; and the bolt holes 4 in said heads are counterbored, as at 4a, at their inner end to accommodate the inwardly offset groove forming portions 9a of said drum.

The reel is assembled preferably by slipping the heads 2 over the ends of the drum with said ends of said drum seated in the annular grooves 10 in the inner faces of the heads and with the adjacent ends of the inwardly offset groove forming portions 9a of the drum seated in the counterbored inner end portions 4a of the bolt holes 4 in the heads. By this arrangement the heads 2 are positioned on the ends of the drum 1 with their bolt holes 4 in register with the ends of the longitudinal grooves 9 in the outer periphery thereof and relative rotary movement of the heads and drum is prevented by the seating of the ends of the groove forming portions 9a of the drum in the counterbored inner ends of the bolt holes 4 in the heads. The heads 2 may then be quickly and easily rigidly secured to the drum 1 by sliding the bolts through the bolt holes in one head, along the grooves 9 and through the bolt holes in the other head and then applying the nuts 6 to said bolts. When thus applied, the bolts 3 seat in the longitudinal grooves 9 in the outer peripheral surface of the drum 1 flush with said surface so that the wire rope, cordage or other strand material may be wound around the drum without interference from said bolts.

Obviously numerous changes may be made without departing from the invention and I do not wish to be limited to the precise construction shown.

What I claim is:

A reel comprising a hollow cylindrical thin-walled shell with open ends, separate circular heads, and bolts for securing said heads to said open ends of said shell, said shell having inwardly offset portions forming grooves in the outer peripheral surface thereof that extend continuously from end to end of said shell, said heads having circular series of bolt holes therethrough registering with the adjacent ends of said grooves, and bolts extending continuously through said registering grooves and bolt holes from end to end of said reel substantially flush with said outer peripheral surface of said shell, said heads each having an annular groove concentric therewith in its inner end face passing through said bolt holes at said inner face, said open ends of said shell seating in said annular grooves and the ends of the inwardly offset groove forming portions of said shell seating in said inner portions of said bolt holes.

DAVID LARKIN.

REFERENCES CITED

The following references are of record in the file of this patent:

UNITED STATES PATENTS

| Number | Name | Date |
|---|---|---|
| 779,826 | Williams | Jan. 10, 1905 |
| 1,105,289 | Mossberg | July 28, 1914 |
| 1,656,897 | Balthasar | Jan. 24, 1928 |
| 1,767,710 | Smith | July 24, 1930 |

FOREIGN PATENTS

| Number | Country | Date |
|---|---|---|
| 8,895 | Great Britain | 1884 |